(12) United States Patent
Lin et al.

(10) Patent No.: US 11,096,189 B2
(45) Date of Patent: Aug. 17, 2021

(54) METHOD AND DEVICE FOR TRANSMITTING UPLINK DATA

(71) Applicant: GUANGDONG OPPO MOBILE TELECOMMUNICATIONS CORP., LTD., Guangdong (CN)

(72) Inventors: Yanan Lin, Guangdong (CN); Jia Shen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/705,459

(22) Filed: Dec. 6, 2019

(65) Prior Publication Data
US 2020/0120687 A1 Apr. 16, 2020

Related U.S. Application Data

(63) Continuation of application No. PCT/CN2018/114224, filed on Nov. 6, 2018.

(30) Foreign Application Priority Data

Nov. 10, 2017 (WO) ................ PCT/CN2017/110533

(51) Int. Cl.
*H04W 72/12* (2009.01)
*H04L 5/00* (2006.01)
*H04W 72/04* (2009.01)

(52) U.S. Cl.
CPC ......... *H04W 72/1205* (2013.01); *H04L 5/008* (2013.01); *H04L 5/0048* (2013.01);
(Continued)

(58) Field of Classification Search
CPC .......... H04W 72/1205; H04W 72/042; H04W 72/0413; H04W 72/1289; H04W 72/0446;
(Continued)

(56) References Cited

U.S. PATENT DOCUMENTS 9,781,744 B1 10/2017 Tenny et al.
2017/0223677 A1 8/2017 Dinan et al.
(Continued)

FOREIGN PATENT DOCUMENTS

CN 105592558 A 5/2016
CN 106507486 A 3/2017
(Continued)

OTHER PUBLICATIONS

International search report with English Translation issued in corresponding international application No. PCT/CN2017/110533, dated Aug. 1, 2018 (5 pages).
(Continued)

*Primary Examiner* — Walli Z Butt

(57) ABSTRACT

Disclosed are a method and device for transmitting data. The method includes: a network device sending configuration information to a terminal device, the configuration information including at least one of the following: information for indicating a starting position for transmission of an uplink data block, information for indicating an end position for transmission of an uplink data block, and information for configuring a reference signal for transmission of an uplink data block; and according to the configuration information, the network device receiving an uplink data block sent by the terminal device.

16 Claims, 6 Drawing Sheets

300

A terminal device receives configuration information sent by a network device, and the configuration information includes at least one of the following: information for indicating a starting position of transmission of an uplink data block, information for indicating an end position of transmission of an uplink data block, and information for configuring a reference signal for transmission of an uplink data block — S310

The terminal device sends uplink data to the network device according to the configuration information — S320

(52) U.S. Cl.
CPC ......... *H04L 5/0053* (2013.01); *H04W 72/042* (2013.01); *H04W 72/0413* (2013.01)

(58) Field of Classification Search
CPC . H04W 72/12; H04W 72/04; H04W 72/1268; H04L 5/0048; H04L 5/008; H04L 5/0053; H04L 1/0038; H04L 1/0052; H04L 5/0094
See application file for complete search history.

(56) References Cited

U.S. PATENT DOCUMENTS

| | | | |
|---|---|---|---|
| 2017/0325225 A1 | 11/2017 | Dinan | |
| 2018/0176945 A1* | 6/2018 | Cao | H04L 5/0055 |
| 2018/0199359 A1* | 7/2018 | Cao | H04L 5/0094 |
| 2019/0230689 A1* | 7/2019 | Cao | H04L 1/189 |
| 2020/0022125 A1* | 1/2020 | Li | H04L 5/0005 |
| 2020/0028640 A1* | 1/2020 | Yeo | H04L 5/0051 |

FOREIGN PATENT DOCUMENTS

| | | |
|---|---|---|
| CN | 106559844 A | 4/2017 |
| CN | 106888077 A | 6/2017 |
| CN | 106992847 A | 7/2017 |
| EP | 3541133 A1 | 9/2019 |

OTHER PUBLICATIONS

3GPP TS 38.214 V1.0.0 (Sep. 2017); 3rd Generation Partnership Project; Technical Specification Group Radio Access Network; NR; Physical layer procedures for Data (Release 15).
3GPP TS 36.214 V15.0.0 (Sep. 2017); 3rd Generation Partnership Project; Technical Specification Group Radio Access Network; Evolved Universal Terrestrial Radio Access (E-UTRA); Physical layer Measurements (Release 15).
Extended European Search Report for EP Application 18875256.2 dated Jun. 9, 2020.
3GPP TSG RAN WG1 Meeting #90bis; Prague, Czech Republic, Oct. 9-13, 2017; R1-1718815.
3GPP TSG RAN WG1 Meeting #90; Aug. 21-25, 2017; Prague, Czech Republic; R1-1715082.
Canada Office Action for CA Application 3,066,185 dated Feb. 11, 2021.
Communication pursuant to Article 94(3) EPC Examination for EP Application 18875256.2 dated Nov. 26, 2020.
Chile Office Action with English Translation for CL Application 2019-003823 dated Apr. 22, 2021.
European Examination Report for EP Application 18875256.2 dated Jun. 1, 2021.

* cited by examiner

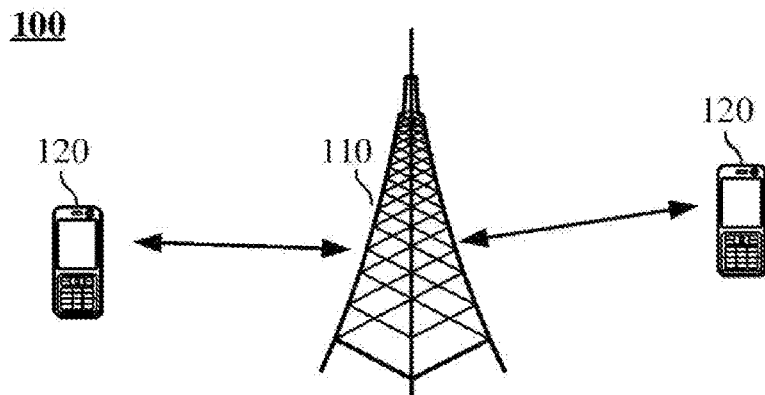
FIG. 1
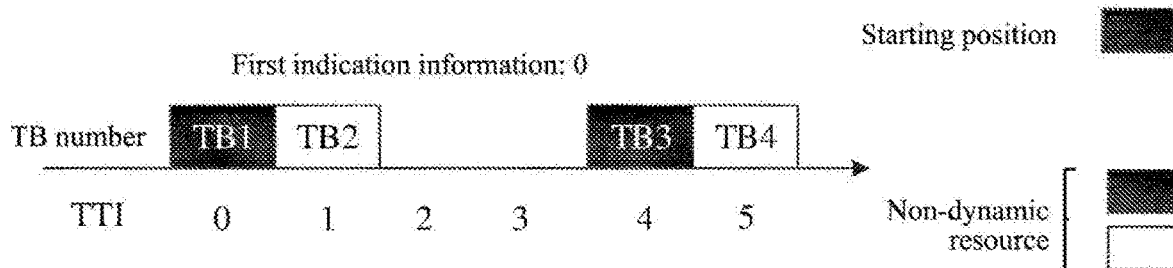
FIG. 2
FIG. 3

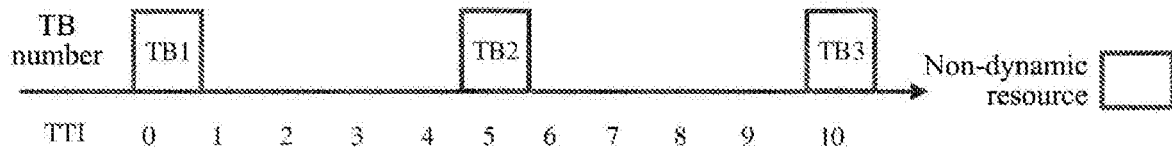

A terminal device receives configuration information sent by a network device, and the configuration information includes at least one of the following: information for indicating a starting position of transmission of an uplink data block, information for indicating an end position of transmission of an uplink data block, and information for configuring a reference signal for transmission of an uplink data block ~S310

The terminal device sends uplink data to the network device according to the configuration information ~S320

FIG. 9

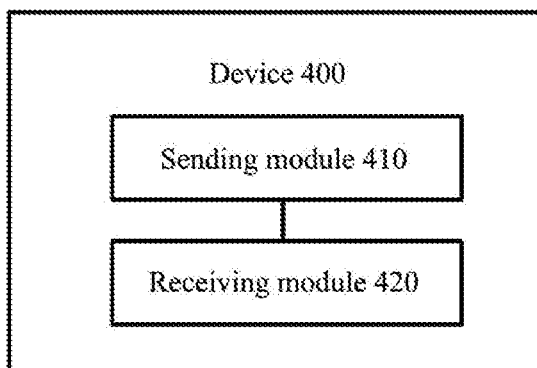

FIG. 10

METHOD AND DEVICE FOR TRANSMITTING UPLINK DATA

CROSS-REFERENCE TO RELATED APPLICATION(S)

This application is a continuation application of International Application No. PCT/CN2018/114224, filed on Nov. 6, 2018, which claims priority to International Application No. PCT/CN2017/110533, filed on Nov. 10, 2017, and the entire disclosures of both applications are hereby incorporated by reference.

TECHNICAL FIELD

Implementations of the present disclosure relate to the communication field, and more particularly, to a method and device for transmitting data.

BACKGROUND

In a 5G New Radio (NR) system, an Ultra-Reliable Low Latency Communication (URLLC) service is introduced, whose characteristic is that ultra-high reliability (e.g. 99.999%) transmission could be realized within an extreme latency (e.g. 1 ms). To achieve the above aim, a concept of Grant free is proposed. A Grant free scheduling mode adopts a semi-static configuration mode (i.e. Type1 mode) or a semi-static configuration plus dynamic triggering mode (i.e. Type2 mode) as its resource configuration mode. A terminal device may transmit data on resources semi-statically configured (Type1) or semi-statically configured plus dynamically triggered (Type2) according to service demands, thus avoiding a process of resource request (SR) initiation and Buffer Status Report (BSR), and increasing effective transmission time of the terminal device.

However, in the Grant free scheduling mode, resources are occupied dynamically, which increases a blind detection complexity of a network device. Sometimes it may occur that services cannot be transmitted in time due to limited resource dynamic occupation (e.g., an initial sending location is limited), thus affecting user experience. Therefore, a technical solution is needed to solve the above problem.

SUMMARY

Implementations of the present disclosure provide a method and device for transmitting data.

In a first aspect, a method for transmitting data is provided. The method includes: a network device sending configuration information to a terminal device, wherein the configuration information includes at least one of the following: information for indicating a starting position of transmission of an uplink data block, information for indicating an end position of transmission of an uplink data block, and information for configuring a reference signal for transmission of an uplink data block; the network device receiving an uplink data block sent by the terminal device according to the configuration information.

In combination with the first aspect, in some possible implementations of the first aspect, the information for indicating the starting position of the transmission of the uplink data block is used for indicating whether a first transmission of the uplink data block is capable of being initiated at any position of a non-dynamic resource which is a resource for non-dynamic scheduling transmission.

Optionally, in the implementation of the present disclosure, the network device may configure the terminal device to initiate the first transmission of the uplink data block at any position of the non-dynamic resource or on a specific non-dynamic resource according to the time delay requirements of the services transmitted on the non-dynamic resource, which is beneficial for meeting the time delay requirements of different services, and can also reduce a blind detection complexity of the network device, or can avoid decrease of the system capacity. For example, for services with high delay requirements, it may be configured that the first transmission of the uplink data block can be initiated at any position of the non-dynamic resource, thus timely transmission of the uplink data block can be realized and user experience can be improved. For services with low delay requirements, it may be configured that the first transmission of the uplink data block can be initiated on a specific non-dynamic resource, so that configuration of the starting position can be better matched with the delay characteristics of the service while a blind detection complexity at the network side can be reduced, or decrease of the system capacity can be avoided.

In combination with the first aspect, in some possible implementations of the first aspect, the information for indicating the starting position of the transmission of the uplink data block is used for indicating a resource position where a first transmission of the uplink data block is capable of being initiated in a non-dynamic resource which is a resource for non-dynamic scheduling transmission.

Optionally, in the implementation of the present disclosure, the network device may configure the terminal device to initiate the first transmission of the uplink data block on all the non-dynamic resource or part of the non-dynamic resource according to the time delay requirements of the services transmitted on the non-dynamic resource, which is beneficial for meeting the time delay requirements of different services, and can also reduce a blind detection complexity of the network device, or can avoid decrease of the system capacity. For example, for services with high delay requirements, it may be configured that the first transmission of the uplink data block can be initiated at any position of the non-dynamic resource, thus timely transmission of the uplink data block can be realized and user experience can be improved. For services with low delay requirements, it may be configured that the first transmission of the uplink data block can be initiated on part of the non-dynamic resource, so that configuration of the starting position can be better matched with the delay characteristics of the service while a blind detection complexity at the network side can be reduced, or decrease of the system capacity can be avoided. In addition, the flexibility of uplink data transmission can be improved.

In combination with the first aspect, in some possible implementations of the first aspect, the information for indicating the end position of the transmission of the uplink data block is used for indicating an end position for sending the uplink data block in a non-dynamic resource which is a resource for non-dynamic scheduling transmission. It can not only match the transmission requirements of the services to a certain extent, but also avoid erroneous data combination or reduce the number of blind detections of the network device.

In combination with the first aspect, in some possible implementations of the first aspect, the end position for sending the uplink data block in the non-dynamic resource is a last transmission opportunity in a period of the non-dynamic resource.

In combination with the first aspect, in some possible implementations of the first aspect, the information of the reference signal of the uplink data block includes information of at least one root sequence and information of at least one cyclic shift sequence.

In combination with the first aspect, in some possible implementations of the first aspect, the information of the at least one root sequence is information of a root sequence, the information of the at least one cyclic shift sequence is information of multiple cyclic shift sequences, and different cyclic shift sequences correspond to different numbers of transmission. The network side may determine a number of transmission of the current data block through the received reference signal, which is convenient for the network side to decode the data and/or combine the data transmitted for multiple times to obtain a combination gain.

In combination with the first aspect, in some possible implementations of the first aspect, the information of the at least one root sequence is information of multiple root sequences, the information of the at least one cyclic shift sequence is information of a cyclic shift sequence, and different root sequences correspond to different numbers of transmission. The network side may determine a number of transmission of the current data block through the received reference signal, which is convenient for the network side to decode the data and/or combine the data transmitted for multiple times to obtain a combination gain.

In combination with the first aspect, in some possible implementations of the first aspect, the information for indicating the starting position of the transmission of the uplink data block is shared by multiple serving cells or is for a serving cell; or the information for indicating the end position of the transmission of the uplink data block is shared by multiple cells or is for a cell; or the information for configuring the reference signal for the transmission of the uplink data block is shared by multiple serving cells or is for a serving cell.

In combination with the first aspect, in some possible implementations of the first aspect, starting position information for the transmission of uplink data block is configured to be shared by multiple non-dynamic resources or is configured for a non-dynamic resource; or end position information for the transmission of an uplink data block is configured to be shared by multiple non-dynamic resources or is configured for a non-dynamic resource; or the information for configuring the reference signal for the transmission of the uplink data block is configured to be shared by multiple non-dynamic resources or is configured for a non-dynamic resource.

In combination with the first aspect, in some possible implementations of the first aspect, the non-dynamic scheduling is a scheduling mode other than a dynamic scheduling.

In combination with the first aspect, in some possible implementations of the first aspect, the non-dynamic scheduling includes a semi-statically configured transmission mode and a semi-statically configured plus dynamically triggered transmission mode.

In a second aspect, a method for transmitting data is provided. The method includes: a terminal device receiving configuration information sent by a network device, and the configuration information including at least one of the following: information for indicating a starting position of transmission of an uplink data block, information for indicating an end position of transmission of an uplink data block, and information for configuring a reference signal for transmission of an uplink data block; and the terminal device sending uplink data to the network device according to the configuration information.

In combination with the second aspect, in some possible implementations of the second aspect, the information for indicating the starting position of the transmission of the uplink data block is used for indicating whether a first transmission of the uplink data block is capable of being initiated at any position of a non-dynamic resource which is a resource for non-dynamic scheduling transmission.

In combination with the second aspect, in some possible implementations of the second aspect, the information for indicating the starting position of the transmission of the uplink data block is used for indicating a resource position where a first transmission of the uplink data block is capable of being initiated in a non-dynamic resource which is a resource for non-dynamic scheduling transmission.

In combination with the second aspect, in some possible implementations of the second aspect, the information for indicating the end position of the transmission of the uplink data block is used for indicating an end position for sending the uplink data block in a non-dynamic resource which is a resource for non-dynamic scheduling transmission.

In combination with the second aspect, in some possible implementations of the second aspect, the end position for sending the uplink data block in the non-dynamic resource is a last transmission opportunity in a period of the non-dynamic resource.

In combination with the second aspect, in some possible implementations of the second aspect, the information of the reference signal of the uplink data block includes information of at least one root sequence and information of at least one cyclic shift sequence.

In combination with the second aspect, in some possible implementations of the second aspect, the information of the at least one root sequence is information of a root sequence, the information of the at least one cyclic shift sequence is information of multiple cyclic shift sequences, and different cyclic shift sequences correspond to different numbers of transmission.

In combination with the second aspect, in some possible implementations of the second aspect, sending, by the terminal device, the uplink data to the network device according to the configuration information includes: the terminal device determines a corresponding target cyclic shift sequence in the multiple cyclic shift sequences according to a number of transmission of the uplink data; generates a corresponding reference signal sequence according to the root sequence and the target cyclic shift sequence; and the terminal device sends the reference signal sequence.

In combination with the second aspect, in some possible implementations of the second aspect, the information of the at least one root sequence is information of multiple root sequences, the information of the at least one cyclic shift sequence is information of a cyclic shift sequence, and different root sequences correspond to different numbers of transmission.

In combination with the second aspect, in some possible implementations of the second aspect, sending, by the terminal device, the uplink data to the network device according to the configuration information includes: the terminal device determines a corresponding target root sequence in the multiple root sequences according to a number of transmission of the uplink data; generates a corresponding reference signal sequence according to the target root sequence and the cyclic shift sequence; and the terminal device sends the reference signal sequence.

In combination with the second aspect, in some possible implementations of the second aspect, the information for indicating the starting position of the transmission of the uplink data block is shared by multiple serving cells or is for a serving cell; or the information for indicating the end position of the transmission of the an uplink data block is shared by multiple cells or is for a cell; or the information for configuring the reference signal for the transmission of the uplink data block is shared by multiple serving cells or is for a serving cell.

In combination with the second aspect, in some possible implementations of the second aspect, starting position information for the transmission of an uplink data block is configured to be shared by multiple non-dynamic resources or is configured for a non-dynamic resource; or end position information for the transmission of an uplink data block is configured to be shared by multiple non-dynamic resources or is configured for a non-dynamic resource; or the information for configuring the reference signal for the transmission of the uplink data block is configured to be shared by multiple non-dynamic resources or is configured for a non-dynamic resource.

In combination with the second aspect, in some possible implementations of the second aspect, the non-dynamic scheduling is a scheduling mode other than a dynamic scheduling.

In combination with the second aspect, in some possible implementations of the second aspect, the non-dynamic scheduling includes a semi-statically configured transmission mode and a semi-statically configured plus dynamically triggered transmission mode.

In a third aspect, a device for transmitting data is provided for performing the method of the first aspect or any possible implementation of the first aspect. Specifically, the device includes units for performing the method of the first aspect or any one of the possible implementations of the first aspect.

In a fourth aspect, a device for transmitting data is provided, and the device includes a memory, a processor, an input interface, and an output interface. The memory, the processor, the input interface and the output interface are connected through a bus system. The memory is used for storing instructions, and the processor is used for executing the instructions stored in the memory for executing the method of the first aspect or any one of the possible implementations of the first aspect.

In a fifth aspect, a device for transmitting data is provided for performing the method of the second aspect or any one of the possible implementations of the second aspect. Specifically, the device includes units for performing the method of the second aspect or any one of the possible implementations of the second aspect.

In a sixth aspect, a device for transmitting data is provided, and the device includes a memory, a processor, an input interface, and an output interface. The memory, the processor, the input interface and the output interface are connected through a bus system. The memory is used for storing instructions, and the processor is used for executing the instructions stored in the memory for executing the method of the second aspect or any one of the possible implementations of the second aspect.

In a seventh aspect, a computer storage medium is provided for storing computer software instructions for executing the method of the first aspect or any possible implementation of the first aspect, and the computer software instructions include programs designed for executing the aspect.

In an eighth aspect, a computer program product containing instructions is provided, when the instructions are run on a computer, the computer is enabled to perform the method of the first aspect or any one of optional implementations of the first aspect.

In a ninth aspect, a computer storage medium is provided for storing computer software instructions for executing the method of the second aspect or any possible implementation of the second aspect, and the computer software instructions include programs designed for executing the aspect.

In a tenth aspect, a computer program product containing instructions is provided, when the instructions are run on a computer, the computer is enabled to perform the method of the second aspect or any one of optional implementations of the second aspect.

BRIEF DESCRIPTION OF DRAWINGS

FIG. 1 shows a schematic diagram of an application scenario according to an implementation of the present disclosure.

FIG. 2 shows a schematic flowchart of a method for transmitting data according to an implementation of the present disclosure.

FIG. 3 shows a schematic diagram of an indication mode for first indication information.

FIG. 8 shows a schematic diagram of an indication mode for configuration information.

FIG. 9 shows a schematic flowchart of a method for transmitting data according to another implementation of the present disclosure.

FIG. 10 shows a schematic block diagram of a device for transmitting data according to an implementation of the present disclosure.

DETAILED DESCRIPTION

Figure 4:
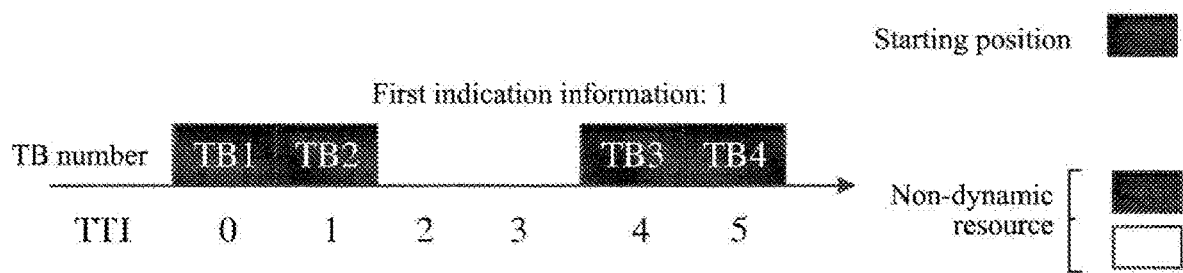
FIG. 4 shows a schematic diagram of an indication mode for the first indication information.

Hereinafter, technical solutions in the implementations of the present disclosure will be described with reference to the accompanying drawings.

The technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, or a future 5G system.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a specific geographical area, and may communicate with a terminal device (e.g., UE) in the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

In an implementation of the present disclosure, a Grant free configuration mode may include two types, i.e., Type1 and Type2. Herein Type1 is to configure a Grant free resource (or may also be referred to as a non-dynamic resource) using Radio Resource Control (RRC) signaling, and the Grant free resource may include a time-frequency domain resource, reference signal information, a modulation coding mode, power control parameters and other information. Type2 is to configure a Grant free resource through joint configuration by high-level signaling (semi-static configuration) and physical layer signaling. Herein the configuration by the RRC signaling includes a time domain resource period and power control parameters, and the configuration by the physical layer signaling includes a frequency domain resource, reference signal information, a modulation coding mode, power control parameters and other information.

FIG. 2 is a schematic flowchart of a method 200 for transmitting data provided by an implementation of the present disclosure. The method 200 may be executed by the network device in the communication system 100 shown in FIG. 1. As shown in FIG. 2, the method 200 may include acts S210 and S220.

In S210, a network device sends configuration information to a terminal device, and the configuration information includes at least one of the following: information for indicating a starting position of transmission of an uplink data block, information for indicating an end position of transmission of an uplink data block, and information for configuring a reference signal for transmission of an uplink data block.

In S220, the network device receives an uplink data block sent by the terminal device according to the configuration information.

It should be noted that the configuration information in the implementation of the present disclosure is configuration information specific to the non-dynamic resource (i.e., Grant free resource), or in other words, the configuration information is used for configuration of the non-dynamic resource. The non-dynamic resource is a resource for non-dynamic scheduling transmission, and the non-dynamic scheduling is a scheduling mode other than a dynamic scheduling (e.g., scheduling via physical layer signaling), for example, a semi-statically configured transmission mode (e.g., Type1 transmission mode), or a semi-statically configured plus dynamically triggered transmission mode (e.g., Type2 transmission mode).

It should also be noted that in the implementation of the present disclosure, the above-mentioned non-dynamic resource may be a time domain resource, a frequency domain resource, or a code domain resource, etc. for non-dynamic scheduling transmission. Similarly, the starting position for the transmission of the uplink data block may refer to the starting position (i.e., starting time domain position) of the time domain resource in the non-dynamic resource, or may refer to the starting position of the frequency domain resource or the code domain resource in the non-dynamic resource. The end position for the transmission of the uplink data block may refer to the end position (i.e., the end time domain position) of the time domain resource in the non-dynamic resource, or may refer to the end position of the frequency domain resource or the code domain resource in the non-dynamic resource. The implementations of the present disclosure are not specifically limited thereto. Descriptions are made in the implementations of the present disclosure mainly by taking the starting position and the end position being the starting time domain position and the ending time domain position respectively as an example. According to the teachings of the implementations of the present disclosure, the obtained relevant technical solutions indicating the starting position or end position for uplink transmission on the frequency domain resource or the code domain resource fall within the protection scope of the implementations of the present disclosure.

It should be understood that the Grant free resource may be periodic. For example, the Grant free resource in each period may be multiple continuous time domain resources or multiple discontinuous time domain resources. Or it may be considered that the terminal device has only one transmission opportunity in each period, and the terminal device may perform uplink transmission on the Grant free resource in the each period. Alternatively, the Grant free resource may be aperiodic. It is not specifically limited in the implementations of the present disclosure.

Hereinafter, a method for transmitting data according to the implementations of the present disclosure will be described in detail with reference to Implementations 1 to 3.

In Implementation 1, the information for indicating the starting position of the transmission of the uplink data block may be used for indicating whether a first transmission of the uplink data block is capable of being initiated at any position of a non-dynamic resource.

For example, when the Grant free resource is used for transmitting delay-insensitive services (e.g., Voice over Internet Protocol (VoIP) services based on network protocols, or periodic services), i.e., services with lower delay requirements, the network device may configure the terminal device to initiate a first transmission of an uplink data block on a specific Grant free resource. Herein the specific Grant free resource may be agreed by the protocol or pre-configured to the terminal device by the network device. In this case, the information for indicating the starting position of the transmission of the uplink data block may be used for indicating that the first transmission of the uplink data block cannot be initiated at any position of the non-dynamic resource, so that the terminal device can only initiate the first transmission of the uplink data on a specific Grant free resource.

For another example, when the Grant free resource is used for transmitting delay-sensitive services, i.e. services with higher delay requirements, the network device may configure the terminal device to initiate the first transmission of the uplink data block at any position of the Grant free resource, so that the terminal device may transmit the uplink data block in time, which is beneficial for avoiding usage limitation of the non-dynamic resource (e.g. limitation of the starting transmission position of the resource). In this case, the information for indicating the starting position of the transmission of the uplink data block may be used for indicating that the first transmission of the uplink data block is capable of being initiated at any position of the non-dynamic resource.

Therefore, according to the method for transmitting data in the implementations of the present disclosure, the network device may configure the terminal device to initiate the first transmission of the uplink data block at any position of the non-dynamic resource or on a specific non-dynamic resource according to the time delay requirements of the services transmitted on the non-dynamic resource, which is beneficial for meeting the time delay requirements of different services, and can also reduce a blind detection complexity of the network device, or can avoid decrease of the system capacity. For example, for services with high delay requirements, it may be configured that the first transmission of the uplink data block is capable of being initiated at any position of the non-dynamic resource, thus timely transmission of the uplink data block can be realized and user experience can be improved. For services with low delay requirements, it may be configured that the first transmission of the uplink data block is initiated on a specific non-dynamic resource, so that configuration of the starting position can be better matched with the delay characteristics of the services while a flexibility of uplink data transmission can be improved.

For convenience of distinction and description, in the implementations of the present disclosure, the information for indicating the starting position of the transmission of the uplink data block is labeled as first indication information, that is, the first indication information may indicate the information for indicating the position of the transmission of the uplink data block. Optionally, in Implementation 1, 1 bit may be used for the first indication information. For example, it may be configured that when the first indication information is 0, it indicates that the first transmission of the uplink data block cannot be initiated at any position of the non-dynamic resource, and when the first indication information is 1, it indicates that the first transmission of the uplink data block is capable of being initiated at any position of the non-dynamic resource. Or the reverse indications may be configured, and the implementations of the present disclosure are not limited thereto.

Correspondingly, the terminal device may initiate the first transmission of the uplink data block according to the information, configured by the network device, for indicating the starting position of the transmission of the uplink data block. If the uplink data block needs to be retransmitted, the terminal device may perform subsequent data transmission according to resource patterns dynamically configured or preconfigured, or may perform subsequent transmission using continuous resources, i.e. the resources immediately following the resources for the first transmission are used for subsequent transmission. "Continuous" herein preferably is continuous in the time domain.

It should be understood that the terminal device performs uplink transmission when there are service requirements, that is, the terminal device performs uplink transmission according to the above configuration information only when there are service requirements.

Hereinafter, an indication mode of the first indication information will be described with reference to specific examples shown in FIGS. 3 and 4.

As shown in FIG. 3, the first indication information is used for indicating that the first transmission of the uplink data block cannot be initiated at any position of the non-dynamic resource. In this case, the first indication information may be 0, that is, it may be configured that when the first indication information is 0, it indicates that the first transmission of the uplink data block cannot be initiated at any position of the non-dynamic resource. In this case, the terminal device may initiate the first transmission of the uplink data block on a specific Grant free resource, which is part of the Grant free resource. For example, the Grant free resource in a period may include 4 Transmission Time Intervals (TTIs), i.e., TTI0, TTI1, TTI4 and TTI5, and the specific Grant free resource may include TTI0 and TTI4 as indicated by shaded parts in FIG. 3a. In such way, in a transmission opportunity (i.e. within a Grant free resource period), the terminal device may initiate the first transmission of the uplink data block on TTI0 or TTI4, but cannot initiate the first transmission of the uplink data block on TTI1 and TTI5.

As shown in FIG. 4, the first indication information is used for indicating that the first transmission of the uplink data block is capable of being initiated at any position of the non-dynamic resource, in this case, the first indication information may be 1. That is, it may be configured that when the first indication information is 0, it indicates that the first transmission of the uplink data block cannot be initiated at any position of the non-dynamic resource. In FIG. 4, the Grant free resource in a period may include TTI0, TTI1, TTI4 and TTI5, and in this case, the terminal device may initiate the first transmission of the uplink data block at any position of the above resource.

Implementation 2: The information for indicating the starting position of the transmission of the uplink data block is used for indicating a resource position where a first transmission of an uplink data block is capable of being initiated in a non-dynamic resource which is a resource for non-dynamic scheduling transmission.

Different from that in the Implementation 1, in the Implementation 2, the information for indicating the starting position of the transmission of the uplink data block may directly indicate the resource position where the first transmission of the uplink data block is capable of being initiated. Preferably, a bitmap mode may be used for the resource position for the first transmission of the uplink data block.

For example, when the Grant free resource is used for transmitting delay-insensitive services, i.e., services with low delay requirements, the network device may configure the terminal device to initiate the first transmission of the uplink data block on part of the Grant free resource, i.e., the information for indicating the starting position of the transmission of the uplink data block may be used for indicating part of the non-dynamic resource. Herein part of the Grant free resource may be used for the first transmission within the Grant free resource period. In this case, the terminal device cannot initiate the first transmission of the uplink data block at any position of the non-dynamic resource, and can only initiate the first transmission of the uplink data on part of the Grant free resource.

For another example, when the Grant free resource is used for transmitting delay-sensitive services, i.e. services with high delay requirements, the information for indicating the starting position of the transmission of the uplink data block may be used for indicating all of the non-dynamic resource, and the terminal device may initiate the first transmission of the uplink data block at any position of the Grant free resource. Thus, when the terminal device needs to transmit delay-sensitive services, the terminal device may transmit the uplink data block in time, which is beneficial for avoiding a transmission delay caused by usage limitation of non-dynamic resource (e.g. limitation of the starting transmission position of the resource).

Therefore, according to the method for transmitting data in the implementations of the present disclosure, the network device may configure the terminal device to initiate the first transmission of the uplink data block on all of the non-dynamic resource or part of the non-dynamic resource according to the time delay requirements of the services transmitted on the non-dynamic resource, which is beneficial for meeting the time delay requirements of different services, can also reduce the blind detection complexity of the network device, or can avoid the decrease of the system capacity. For example, for services with high delay requirements, it may be configured that the first transmission of the uplink data block is capable of being initiated at any position of the non-dynamic resource, thus timely transmission of the uplink data block can be realized and user experience can be improved. For services with low delay requirements, it may be configured that the first transmission of the uplink data block is initiated on part of the non-dynamic resource, so that configuration of the starting position can be better matched with the delay characteristics of the service while a flexibility of uplink data transmission can be improved.

Hereinafter, an indication mode of the first indication information will be described with reference to specific examples shown in FIGS. 5 and 6.

Figure 5:
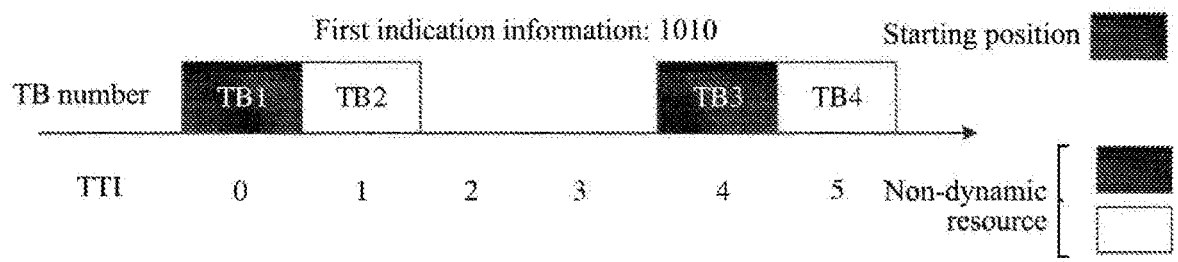
FIG. 5 shows a schematic diagram of another indication mode for the first indication information.
Figure 6:
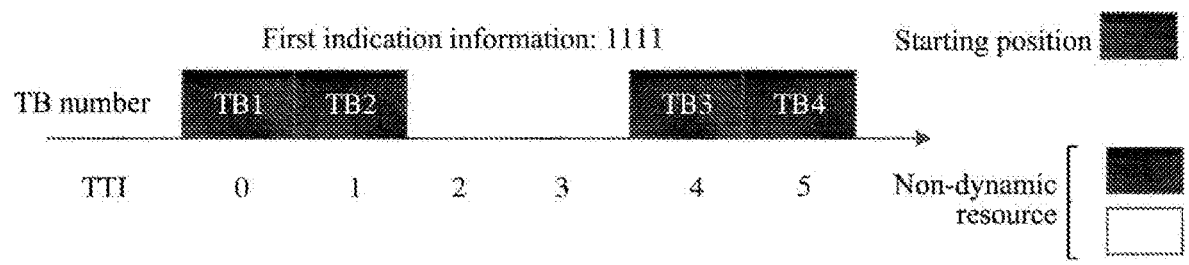
FIG. 6 shows a schematic diagram of another indication mode for the first indication information.

As shown in FIGS. 5 and 6, the information for indicating the starting position of the transmission of the uplink data block, that is, the resource position indicated by the first indication information, may be indicated in a bitmap mode. For example, the Grant free resource in a period may include TTI0, TTI1, TTI4, and TTI5, so the first indication information may be 4 bits, indicating whether TTI0, TTI1, TTI4, and TTI5 can be used for the first transmission of the uplink data block, respectively. For example, in FIG. 5, the first indication information may be 1010, so that the terminal device initiates the first transmission of the uplink data block on TTI0 or TTI4, but cannot initiate the first transmission of the uplink data block on TTI1 and TTI5. In FIG. 6, the first indication information may be 1111, so that the terminal device initiates the first transmission of the uplink data block at any position of TTI0, TTI1, TTI4, and TTI5.

Implementation 3: The information for indicating an end position of transmission of an uplink data block is used for indicating an end position for sending an uplink data block in a non-dynamic resource.

In Implementation 3, the network device may configure information for indicating an end position of transmission of an uplink data block. It should be understood that in this implementation, whether the network device configures a starting position for transmission of an uplink data block is not specifically limited in the implementation of the present disclosure. That is, in the implementations of the present disclosure, the network device may configure only a starting position for transmission of an uplink data block. Alternatively, the network device may configure only an end position for the transmission of an uplink data block. Alternatively, the network device may configure both the starting position for the transmission of an uplink data block and the end position for the transmission of an uplink data block.

For convenience of distinction and description, the information for indicating the end position of the transmission of the uplink data block is labeled as second indication information, that is, the second indication information may be used for indicating the end position of the transmission of the uplink data block.

Similar to Implementation 1, the information for indicating the end position of the transmission of the uplink data block, that is, the second indication information, may further be used for indicating whether the end position for the transmission of the uplink data block is any position of the non-dynamic resource. For example, the second indication information may be 1 bit. It may be configured that when the second indication information is 1, it indicates that the end position for the transmission of the uplink data block may be any position of the non-dynamic resource; and when the second indication information is 0, it indicates that the end position for the transmission of the uplink data block cannot be any position of the non-dynamic resource. In this case, the end position for the uplink data transmission may be a specific position agreed in the protocol, for example, the last TTI in a period of the Grant free resource, or a specific position preconfigured by the network device. The specific implementation process may refer to the relevant description in Implementation 1, which is not repeated here for brevity.

Similar to Implementation 2, the information for indicating the end position of the transmission of the uplink data block, that is, the second indication information may also be used for directly indicating the end position for the transmission of the uplink data block. Preferably, a bitmap mode may be adopted for the second indication information for identifying which positions are the end positions for the transmission of the uplink data block in a Grant free resource period. As an optional implementation, the end position for sending an uplink data block in the non-dynamic resource is a last transmission opportunity in a period of the non-dynamic resource, and the specific implementation process may refer to the relevant description in Implementation 2, which is not repeated here for brevity.

Figure 7:
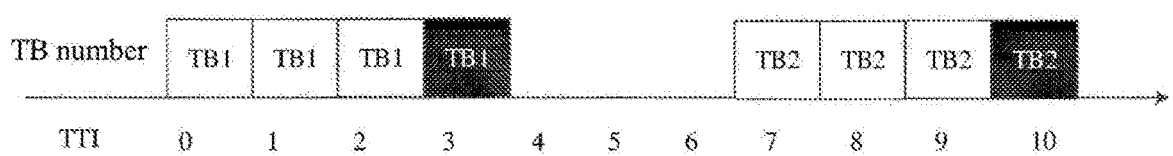
FIG. 7 shows a schematic diagram of an indication mode for second indication information.

Hereinafter, an indication mode of the second indication information will be described in details with reference to a specific example shown in FIG. 7.

For example, the network device configures for the terminal device that a transmission opportunity occupies 4 TTIs and the transmission interval between two transmission opportunities is 7 TTIs, that is, the period of the Grant free resource is 7 TTIs, and the Grant free resource in each period occupies 4 TTIs. As shown in FIG. 7, Grant free resource in a period occupies TTI0 to TTI3, i.e., 4 TTIs in total. In the Implementation 3, the network device may configure the end position for transmission of an uplink data block, for example, the last transmission opportunity in each Grant free resource period, such as TTI3, or TTI10, etc. In this case, the second indication information may be 0001, used for indicating that TTI(7*n+3) is the end positions for uplink data transmission, where n is a non-negative integer, and TTI(7*n+3) may be TTI3, TTI10, etc. Optionally, the second indication information may be 0, it indicates that the end position for uplink data transmission is a specific position (the specific position here may be the last TTI in a Grant free resource period). In this implementation, the starting position for transmission of an uplink data block is not limited, and may be TTI0, or TTI1, or the like.

If the terminal device has data to be transmitted at TTI5, an available transmission resource closest to TTI5 is TTI7. Alternatively, the terminal device may transmit data on TTI7, TTI8, TTI9 and TTI10, or when the terminal device has data to be sent at TTI8, the terminal device may transmit data on TTI8, TTI9 and TTI10.

It should be noted that in the implementations of the present disclosure, the data block transmitted before the end position for transmission of the uplink data block and after the previous end position is the same data block, that is, in TTT0~TTI3, if the end position is TTI3 and if the Transmission Block (TB)1 is transmitted in TTI0, then the data block transmitted in TTI0 to TTI3 is the TB1. That is, TTI3 is the end position of transmission of TB1. Even if the transmission of TB1 is successful before TTI3, such as TTI2, TTI3 is not used for transmitting other TBs. Thus, the network device may perform a combination processing on the data block received before TTI3. Similarly, in a next transmission opportunity (a next Grant free resource period, e.g., TTI7-TTI10), it may be used for transmitting TB2. Before the end position (e.g., TTI10), the network device may perform a combination processing on the received TB2.

Optionally, in some implementations, a transmission resource may be included in each Grant free period. For example, as shown in FIG. 8, the network device configures for the terminal device that a transmission opportunity occupies 1 TTI and a transmission interval between the two transmission opportunities is 5 TTIs, that is, the period of the Grant free resource is 5 TTIs, and Grant free resource in each period occupies 1 TTI. If the first indication information indicates that the first transmission of the uplink data block can be sent at any position of the Grant free resource, the terminal device may perform uplink transmission on a transmission resource of each Grant free period. For example, the terminal device may perform uplink transmission on TTI (5n), where n is a non-negative integer. Or if the first indication information indicates that the first transmission of the uplink data block cannot be sent at any position of the Grant free resource, the terminal device may initiate the first transmission of the uplink data block on a specific Grant free resource, which may be agreed in a protocol or may be preconfigured by the network device. For example, the specific Grant free resource may be TTI (10n), where n is a non-negative integer. For the end position for transmission of the uplink data block, it is similar and will not be repeated here for brevity.

Implementation 4: The information of the reference signal of the uplink data block includes information of at least one root sequence and information of at least one cyclic shift sequence.

Case 1

The information of the at least one root sequence is information of a root sequence, the information of the at least one cyclic shift sequence is information of multiple cyclic shift sequences, and different cyclic shift sequences correspond to different numbers of transmission.

In this case, the terminal device may determine a cyclic shift sequence corresponding to a number i of transmission according to the number i of transmission of the uplink data block, and then generate a corresponding reference signal sequence according to the root sequence and the cyclic shift sequence, so that the i-th transmission of the uplink data block may be performed according to the reference signal sequence.

In this implementation, the network device may configure different cyclic shift sequence sets (corresponding to the above-mentioned multiple cyclic shift sequences) for different terminal devices. By configuring the cyclic shift sequence sets of different terminal devices to maintain orthogonality, inter-user interference can be avoided, and the network device may identify the number of transmission of the uplink data block by detecting the cyclic shift sequence of the reference signal.

Case 2

The information of the at least one root sequence is information of multiple root sequences, the information of the at least one cyclic shift sequence is information of a cyclic shift sequence, and different root sequences correspond to different numbers of transmission.

In this case, the terminal device may determine a root sequence corresponding to a number i of transmission according to the number i of transmission of the uplink data block, and then generate a reference signal sequence according to the root sequence and the cyclic shift sequence, so that the i-th transmission of the uplink data block may be performed according to the reference signal sequence.

In this implementation, the network device may configure different root sequence sets (corresponding to the above-mentioned multiple root sequences) for different terminal devices. The root sequence sets of different terminal devices have low correlation, thus inter-user interference can be avoided, and the network device can identify the number of transmission of the uplink data block by detecting the root sequence of the reference signal.

It should be noted that some or all of the above-mentioned sequence (root sequence and cyclic shift sequence) information remains unchanged during data transmission, or some or all of the above-mentioned sequence information is sequence information for a specific moment. At other moments, the root sequence and cyclic shift sequence information may be obtained according to other rules, and the implementations of the present disclosure are not limited thereto.

For example, at TTI0, the cyclic shift sequence corresponding to the first to fourth transmissions is [0, 1, 2, 3]. According to a frequency modulation rule of the reference signal, $CS_j = CS(j-1) + offset$; $offset = 2$, where $CS_j$ represents the reference signal j, and offset represents an offset between two adjacent reference signals, then it may be determined that at TTI1 the cyclic shift sequence corresponding to the first to fourth transmissions is [2, 3, 4, 5]; at TTI2 the cyclic shift sequence corresponding to the first to fourth transmissions is [4, 5, 6, 7]; and at TTI3, the cyclic shift sequence corresponding to the first to fourth transmissions is [6, 7, 8, 9].

Optionally, in some implementations, the information for indicating the starting position of the transmission of the uplink data block is shared by multiple serving cells, or is for one serving cell. Or, the information for indicating the end position of the transmission of the uplink data block is shared by multiple cells, or is for a cell. Or the information for configuring a reference signal for the transmission of the uplink data block is shared by multiple serving cells or is for a serving cell.

In other words, the network device may configure the same first indication information to the multiple serving cells, that is, the multiple serving cells may configure the same starting position for the transmission of the uplink data block, or the network device may independently configure corresponding first indication information to each serving cell. In other words, the network device may uniformly configure the same first indication information for multiple serving cells, or may independently configure corresponding first indication information for each serving cell in the multiple serving cells, respectively. For the information for indicating the end position of the transmission of the uplink data block and the information for configuring the reference signal for the transmission of the uplink data block, it is similar and will not be repeated here for brevity.

Optionally, in some implementations, the starting position information for the transmission of the uplink data block is configured to be shared by multiple non-dynamic resources or is configured for a non-dynamic resource.

Or, end position information for the transmission of an uplink data block is configured to be shared by multiple non-dynamic resources or is configured for a non-dynamic resource.

Or, the information for configuring the reference signal for the transmission of the uplink data block is configured to be shared by multiple non-dynamic resources or is configured for a non-dynamic resource.

Specifically, if each serving cell is configured with multiple non-dynamic resources, the network device may configure the multiple non-dynamic resources to correspond to the same first indication information, that is, the terminal device may perform uplink transmission on the multiple non-dynamic resources and may adopt the same starting position. Or the network device may configure each non-dynamic resource in the multiple non-dynamic resources to correspond to corresponding first indication information, that is, the terminal device may perform uplink transmission on a certain non-dynamic resource and may adopt the starting position corresponding to the non-dynamic resource. In other words, the network device may uniformly configure the same first indication information for multiple non-dynamic resources, or may independently configure corresponding first indication information for each non-dynamic resource in the multiple non-dynamic resources, respectively. For the information for indicating the end position of the transmission of the uplink data block and the information for configuring the reference signal for the transmission of the uplink data block, it is similar and will not be repeated here for brevity.

The method for transmitting data according to the implementation of the present disclosure is described in detail from a perspective of the network device above in combination with FIGS. 2 to 8, and a method for transmitting data according to another implementation of the present disclosure is described in detail from the perspective of the terminal device below in combination with FIG. 9. It should be understood that the description at the terminal device side corresponds to the description at the network device side, and the above may be referred to for similar description, which will not be repeated here to avoid repetition.

FIG. 9 is a schematic flowchart of a method 300 for transmitting data according to another implementation of the present disclosure. The method 300 may be executed by the terminal device in the communication system shown in FIG. 1. As shown in FIG. 9, the method 300 includes acts S310 and S320.

In S310, a terminal device receives configuration information sent by a network device, and the configuration information includes at least one of the following: information for indicating a starting position of transmission of an uplink data block, information for indicating an end position of transmission of an uplink data block, and information for configuring a reference signal for transmission of an uplink data block.

In S320, the terminal device sends uplink data to the network device according to the configuration information.

Optionally, in some implementations, the information for indicating the starting position of the transmission of the uplink data block is used for indicating whether a first transmission of an uplink data block is capable of being initiated at any position of a non-dynamic resource which is a resource for non-dynamic scheduling transmission.

Optionally, in some implementations, the information for indicating the starting position of the transmission of the uplink data block is used for indicating a resource position where a first transmission of an uplink data block is capable of being initiated in a non-dynamic resource which is a resource for non-dynamic scheduling transmission.

Optionally, in some implementations, the information for indicating the end position of the transmission of the uplink data block is used for indicating an end position for sending the uplink data block in a non-dynamic resource which is a resource for non-dynamic scheduling transmission.

Optionally, in some implementations, the end position for sending the uplink data block in the non-dynamic resource is a last transmission opportunity in a period of the non-dynamic resource.

Optionally, in some implementations, the information of the reference signal of the uplink data block includes information of at least one root sequence and information of at least one cyclic shift sequence.

Optionally, in some implementations, the information of the at least one root sequence is information of a root sequence, the information of the at least one cyclic shift sequence is information of multiple cyclic shift sequences, and different cyclic shift sequences correspond to different numbers of transmission.

Optionally, in some implementations, sending, by the terminal device, uplink data to the network device according to the configuration information includes: the terminal device determines a corresponding target cyclic shift sequence in the multiple cyclic shift sequences according to a number of transmission of the uplink data; generates a corresponding reference signal sequence according to the root sequence and the target cyclic shift sequence; and the terminal device sends the reference signal sequence.

Optionally, in some implementations, the information of the at least one root sequence is information of multiple root sequences, the information of the at least one cyclic shift sequence is information of a cyclic shift sequence, and different root sequences correspond to different numbers of transmission.

Optionally, in some implementations, sending, by the terminal device, uplink data to the network device according to the configuration information includes: the terminal device determines a corresponding target root sequence in the multiple root sequences according to a number of transmission of the uplink data; generates a corresponding reference signal sequence according to the target root sequence and the cyclic shift sequence; and the terminal device sends the reference signal sequence.

Optionally, in some implementations, the information for indicating the starting position of the transmission of the uplink data block is shared by multiple serving cells or is for a serving cell.

Or, the information for indicating the end position of the transmission of the uplink data block is shared by multiple cells or is for a cell.

Or, the information for configuring the reference signal for the transmission of the uplink data block is shared by multiple serving cells or is for a serving cell.

Optionally, in some implementations, the starting position information for the transmission of the uplink data block is configured to be shared by multiple non-dynamic resources or is configured for a non-dynamic resource.

Or, end position information for the transmission of an uplink data block is configured to be shared by multiple non-dynamic resources or is configured for a non-dynamic resource.

Or, the information for configuring the reference signal for the transmission of the uplink data block is configured to be shared by multiple non-dynamic resources or is configured for a non-dynamic resource.

Optionally, in some implementations, the non-dynamic scheduling is a scheduling mode other than a dynamic scheduling.

Optionally, in some implementations, the non-dynamic scheduling includes a semi-statically configured transmission mode and a semi-statically configured plus dynamically triggered transmission mode.

Method implementations of the present disclosure are described in detail above with reference to FIGS. 2 to 9, device implementations of the present disclosure are described in detail below with reference to FIGS. 10 to 13. It should be understood that the device implementations and the method implementations correspond to each other, and description of the method implementations may be referred to for similar description of the device implementations.

FIG. 10 shows a schematic block diagram of a device 400 for transmitting data according to an implementation of the present disclosure. As shown in FIG. 10, the device 400 includes a sending module 410 and a receiving module 420.

The sending module 410 is used for sending configuration information to a terminal device, the configuration information including at least one of the following: information for indicating a starting position of transmission of an uplink data block, information for indicating an end position of transmission of an uplink data block, and information for configuring a reference signal for transmission of an uplink data block.

The receiving module 420 is used for receiving an uplink data block sent by the terminal device according to the configuration information.

Optionally, in some implementations, the information for indicating the starting position of the transmission of the uplink data block is used for indicating whether a first transmission of an uplink data block is capable of being initiated at any position of a non-dynamic resource which is a resource for non-dynamic scheduling transmission.

Optionally, in some implementations, the information for indicating the starting position of the transmission of the uplink data block is used for indicating a resource position where a first transmission of an uplink data block is capable of being initiated in a non-dynamic resource which is a resource for non-dynamic scheduling transmission.

Optionally, in some implementations, the information for indicating the end position of the transmission of the uplink data block is used for indicating an end position for sending the uplink data block in a non-dynamic resource which is a resource for non-dynamic scheduling transmission.

Optionally, in some implementations, the end position for sending the uplink data block in the non-dynamic resource is a last transmission opportunity in a period of the non-dynamic resource.

Optionally, in some implementations, the information of the reference signal of the uplink data block includes information of at least one root sequence and information of at least one cyclic shift sequence.

Optionally, in some implementations, the information of the at least one root sequence is information of a root sequence, the information of the at least one cyclic shift sequence is information of multiple cyclic shift sequences, and different cyclic shift sequences correspond to different numbers of transmission.

Optionally, in some implementations, the information of the at least one root sequence is information of multiple root sequences, the information of the at least one cyclic shift sequence is information of a cyclic shift sequence, and different root sequences correspond to different numbers of transmission.

Optionally, in some implementations, the information for indicating the starting position of the transmission of the uplink data block is shared by multiple serving cells or is for a serving cell; or, the information for indicating the end position of the transmission of the uplink data block is shared by multiple cells or is for a cell; or, the information for configuring the reference signal for the transmission of the an uplink data block is shared by multiple serving cells or is for a serving cell.

Optionally, in some implementations, the information for indicating the starting position for the transmission of the uplink data block is configured to be shared by multiple non-dynamic resources or is configured for a non-dynamic resource; or, the information for indicating the end position for the transmission of the uplink data block is configured to be shared by multiple non-dynamic resources or is configured for a non-dynamic resource; or, the information for configuring the reference signal for the transmission of the uplink data block is configured to be shared by multiple non-dynamic resources or is configured for a non-dynamic resource.

Optionally, in some implementations, the non-dynamic scheduling is a scheduling mode other than a dynamic scheduling.

Optionally, in some implementations, the non-dynamic scheduling includes a semi-statically configured transmission mode and a semi-statically configured plus dynamically triggered transmission mode.

It should be understood that the device 400 for transmitting data according to the implementation of the present disclosure may correspond to the network device in the method implementation of the present disclosure, and the above-mentioned and other operations and/or functions of various units in the device 400 are respectively for realizing the corresponding flow of the network device in the method 200 shown in FIG. 2, which will not be repeated here for brevity.

Figure 11:
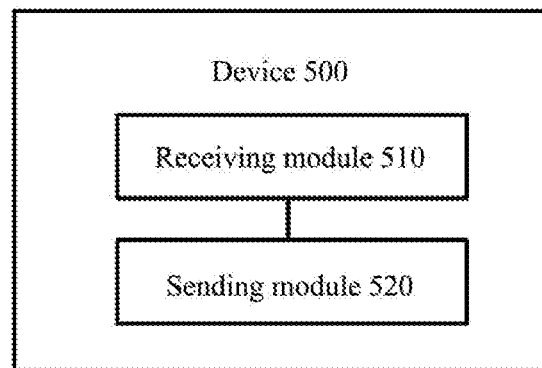
FIG. 11 shows a schematic block diagram of a device for transmitting data according to another implementation of the present disclosure.

FIG. 11 is a schematic block diagram of a device for transmitting data according to an implementation of the present disclosure. The device 500 of FIG. 11 includes a receiving module 510 and a sending module 520.

The receiving module 510 is used for receiving configuration information sent by a network device, the configuration information includes at least one of the following: information for indicating a starting position of transmission of an uplink data block, information for indicating an end position of transmission of an uplink data block, and information for configuring a reference signal of transmission of an uplink data block.

The sending module 520 is used for sending uplink data to the network device according to the configuration information.

Optionally, in some implementations, the information for indicating the starting position of the transmission of the uplink data block is used for indicating whether a first transmission of an uplink data block is capable of being initiated at any position of a non-dynamic resource which is a resource for non-dynamic scheduling transmission.

Optionally, in some implementations, the information for indicating the starting position of the transmission of the uplink data block is used for indicating a resource position where a first transmission of an uplink data block is capable of being initiated in a non-dynamic resource which is a resource for non-dynamic scheduling transmission.

Optionally, in some implementations, the information for indicating the end position of the transmission of the uplink data block is used for indicating an end position for sending the uplink data block in a non-dynamic resource which is a resource for non-dynamic scheduling transmission.

Optionally, in some implementations, the end position for sending the uplink data block in the non-dynamic resource is a last transmission opportunity in a period of the non-dynamic resource.

Optionally, in some implementations, the information of the reference signal of the uplink data block includes information of at least one root sequence and information of at least one cyclic shift sequence.

Optionally, in some implementations, the information of the at least one root sequence is information of a root sequence, the information of the at least one cyclic shift sequence is information of multiple cyclic shift sequences, and different cyclic shift sequences correspond to different numbers of transmission.

Optionally, in some implementations, the device 500 further includes a determination module and a generation module.

The determination module is used for determining a corresponding target cyclic shift sequence in the multiple cyclic shift sequences according to a number of transmission of the uplink data.

The generation module is used for generating a corresponding reference signal sequence according to the root sequence and the target cyclic shift sequence.

The sending module 520 is further used for sending the reference signal sequence.

Optionally, in some implementations, the information of the at least one root sequence is information of multiple root sequences, the information of the at least one cyclic shift sequence is information of a cyclic shift sequence, and different root sequences correspond to different numbers of transmission.

Optionally, in some implementations, the device 500 further includes a determination module and a generation module.

The determination module is used for determining a corresponding target root sequence in the multiple root sequences according to a number of transmission of the uplink data.

The generation module is used for generating a corresponding reference signal sequence according to the target root sequence and the cyclic shift sequence.

The sending module 520 is further used for sending the reference signal sequence.

Optionally, in some implementations, the information for indicating the starting position of the transmission of the uplink data block is shared by multiple serving cells or is for a serving cell; or, the information for indicating the end position of the transmission of the uplink data block is shared by multiple cells or is for a cell; or, the information for configuring the reference signal for the transmission of the uplink data block is shared by multiple serving cells or is for a serving cell.

Optionally, in some implementations, the starting position information for the transmission of the uplink data block is configured to be shared by multiple non-dynamic resources or is configured for a non-dynamic resource; or, end position information for the transmission of an uplink data block is configured to be shared by multiple non-dynamic resources or is configured for an non-dynamic resource; or, the information for configuring the reference signal for the transmission of the uplink data block is configured to be shared by multiple non-dynamic resources or is configured for a non-dynamic resource.

Optionally, in some implementations, the non-dynamic scheduling is a scheduling mode other than a dynamic scheduling.

Optionally, in some implementations, the non-dynamic scheduling includes a semi-statically configured transmission mode and a semi-statically configured plus dynamically triggered transmission mode.

Specifically, the device 500 may correspond to (e.g., may be configured as or itself is) the terminal device described in the method 300, and various modules or units in the device 500 are respectively used for executing various actions or processes performed by the terminal device in the method 300. Herein, to avoid redundancy, detailed description thereof is omitted.

Figure 12:
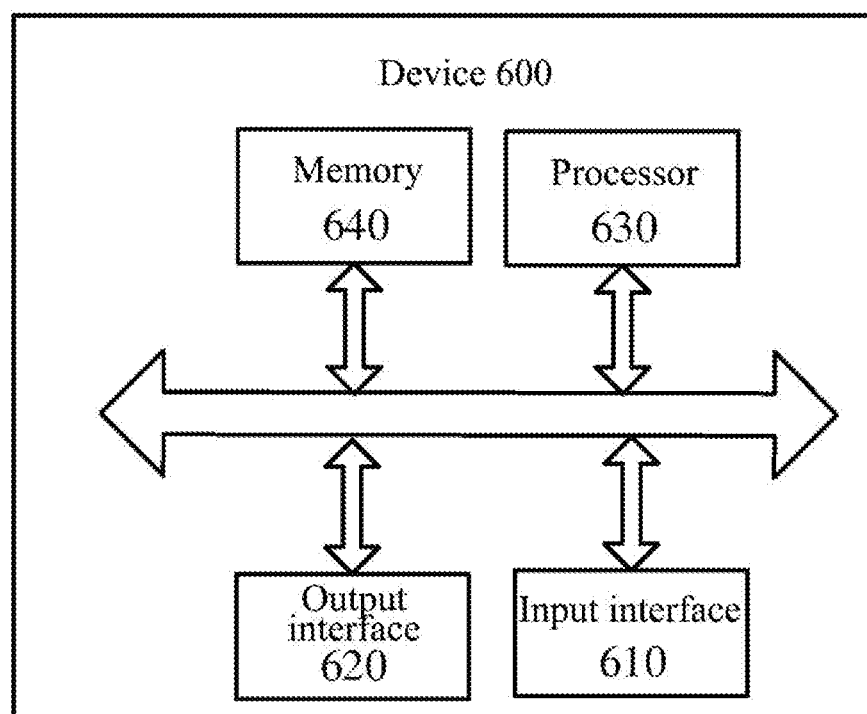
FIG. 12 shows a schematic block diagram of a device for transmitting data according to an implementation of the present disclosure.

As shown in FIG. 12, an implementation of the present disclosure further provides a device 600 for transmitting data, which may be the device 400 in FIG. 10, and can be used for executing the operations of the network device corresponding to the method 200 in FIG. 2. The device 600 includes an input interface 610, an output interface 620, a processor 630, and a memory 640. The input interface 610, the output interface 620, the processor 630, and the memory 640 may be connected through a bus system. The memory 640 is used for storing programs, instructions, or codes. The processor 630 is used for executing programs, instructions, or codes in the memory 640 to control the input interface 610 to receive signals, to control the output interface 620 to send signals, and to complete the operations in the foregoing method implementations.

It should be understood that in the implementations of the present disclosure, the processor 630 may be a Central Processing Unit (CPU), or the processor 630 may be other general purpose processor, a digital signal processor (DSP), an application specific integrated circuits (ASIC), a field programmable gate arrays (FPGA) or other programmable logic device, a discrete gate or transistor logic device, a discrete hardware component, etc. The general processor may be a microprocessor, or the processor may be any conventional processor or the like.

The memory 640 may include the read only memory and random access memory, and provide instructions and data to the processor 630. A portion of memory 640 may include non-volatile random access memory. For example, the memory 640 may further store device type information.

In implementation processes, various acts of the methods described above may be accomplished by integrated logic circuits of hardware or instructions in the form of software in the processor 630. The acts of the method disclosed in combination with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 640, and the processor 630 reads information in the memory 640 and completes the acts of the above method in combination with its hardware. To avoid repetition, it will not be described in detail here.

In a specific implementation, the sending module 410 included in the device 400 in FIG. 10 may be implemented by the output interface 620 in FIG. 12, and the receiving module 420 included in the device 400 in FIG. 10 may be implemented by the input interface 610 in FIG. 12.

Figure 13:
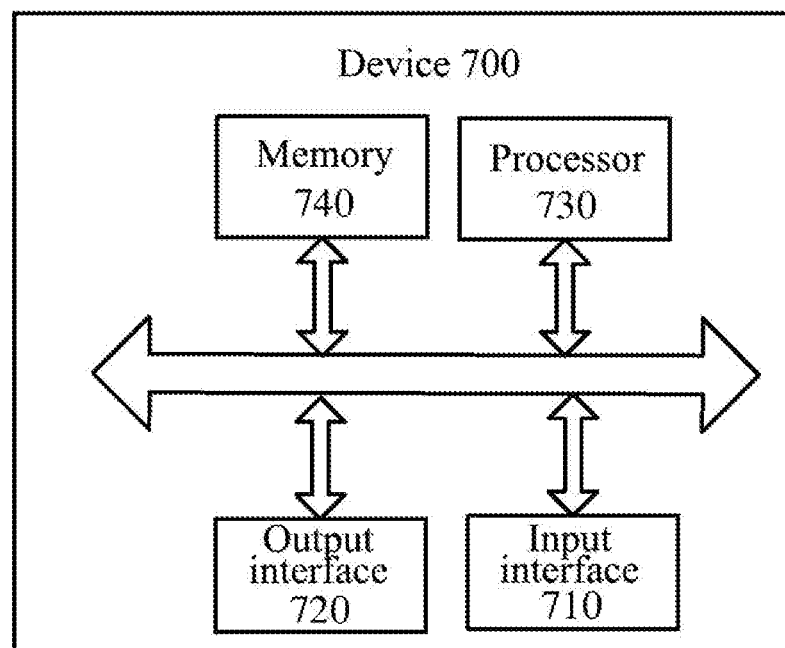
FIG. 13 shows a schematic block diagram of a device for transmitting data according to another implementation of the present disclosure.

As shown in FIG. 13, an implementation of the present disclosure further provides a device 700 for transmitting data, which may be the device 500 in FIG. 11 and may be used for executing the operations of the terminal device corresponding to the method 300 in FIG. 9. The device 700 includes an input interface 710, an output interface 720, a processor 730, and a memory 740. The input interface 710, the output interface 720, the processor 730, and the memory 740 may be connected through a bus system. The memory 740 is used for storing programs, instructions, or codes. The processor 730 is used for executing programs, instructions, or codes in the memory 740 to control the input interface 710 to receive signals, to control the output interface 720 to send signals, and to complete the operations in the foregoing method implementations.

It should be understood that in the implementations of the present disclosure, the processor 730 may be a Central Processing Unit (CPU), or the processor 730 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 740 may include the read only memory and random access memory, and provide instructions and data to the processor 730. A portion of memory 740 may include non-volatile random access memory. For example, the memory 740 may also store device type information.

In implementation processes, various acts of the methods described above may be accomplished by integrated logic circuits of hardware or instructions in the form of software in the processor 730. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 740, and the processor 730 reads information in the memory 740 and completes the acts of the above method in combination with its hardware. To avoid repetition, it will not be described in detail here.

In a specific implementation, the sending module 520 included in the device 500 in FIG. 11 may be implemented by the output interface 720 in FIG. 13, and the receiving module 510 included in the device 500 in FIG. 11 may be implemented by the input interface 710 in FIG. 13, and the determination module and the generation module included in the device 500 in FIG. 11 may be implemented by the processor 730 in FIG. 13.

Figure 14:
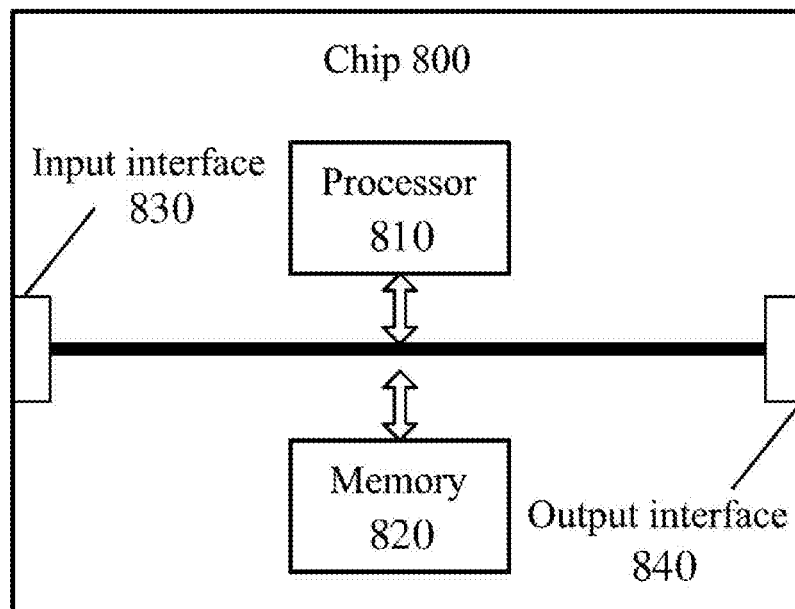
FIG. 14 is a schematic block diagram of a chip provided by an implementation of the present disclosure.

FIG. 14 is a schematic structural diagram of a chip according to an implementation of the present disclosure. The chip 800 shown in FIG. 14 includes a processor 810 that may call and run a computer program from a memory to implement the method in the implementations of the present disclosure.

Optionally, as shown in FIG. 14, the chip 800 may further include a memory 820. Herein, a processor 810 may call and run a computer program from the memory 820 to implement the method in the implementations of the present disclosure.

Herein, the memory 820 may be a separate component independent of the processor 810, or may be integrated in the processor 810.

Optionally, the chip 800 may further include an input interface 830. Herein, the processor 810 may control the input interface 830 to communicate with other devices or chips. Specifically, the processor 810 may acquire information or data sent by other devices or chips.

Optionally, the chip 800 may further include an output interface 840. Herein, the processor 810 may control the output interface 840 to communicate with other devices or chips. Specifically, the processor 810 may acquire information or data sent by other devices or chips.

Optionally, the chip may be applied to the network device in the implementations of the present disclosure, and the chip may implement the corresponding flow implemented by the network device in the various methods in the implementations of the present disclosure, which will not be repeated here for brevity.

Optionally, the chip may be applied to the mobile terminal/terminal device in the implementations of the present disclosure, and the chip may implement the corresponding flow implemented by the mobile terminal/terminal device in the various methods in the implementations of the present disclosure, which will not be repeated here for brevity.

It should be understood that the chip mentioned in the implementations of the present disclosure may also be referred to as a system-level chip, a system chip, a chip system or a system chip on chip, etc.

Figure 15:
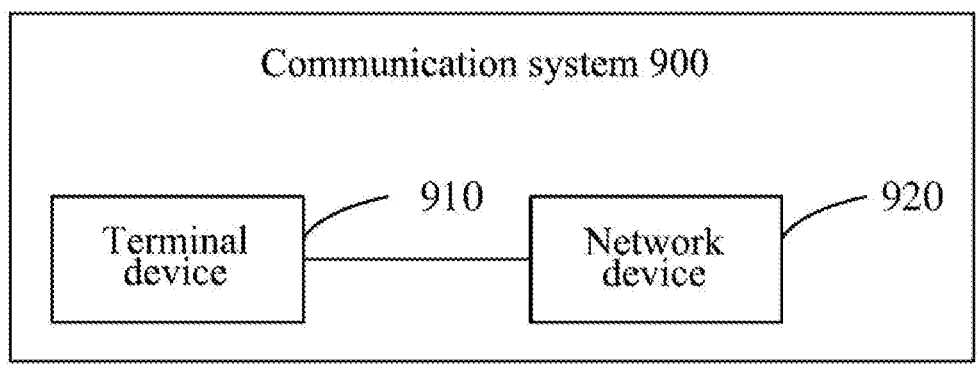
FIG. 15 is a schematic block diagram of a communication system provided by an implementation of the present disclosure.

FIG. 15 is a schematic block diagram of a communication system 900 provided by an implementation of the present disclosure. As shown in FIG. 15, the communication system 900 may include a terminal device 910 and a network device 920.

Herein, the terminal device 910 may be used for implementing the corresponding functions implemented by the terminal device in the above-mentioned methods, and the network device 920 may be used for implementing the corresponding functions implemented by the network device in the above-mentioned methods, which will not be repeated here for brevity.

It should be understood that the processor in an implementation of the present disclosure may be an integrated circuit chip with a capability for processing signals. In the implementation process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The actions of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

Implementations of the present disclosure also provide a computer readable storage medium that stores one or more programs including instructions that, when executed by a portable electronic device including multiple application programs, enable the portable electronic device to perform the methods of the implementations shown in FIGS. 2 and 9.

Implementations of the present disclosure further provide a computer program, which includes instructions that, when executed by a computer, enable the computer to execute the corresponding flow of the method of the implementations shown in FIGS. 2 and 9.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, apparatuses and methods may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, or a network device) to perform all or part of the acts of the method described in various implementations of the present disclosure. The aforementioned storage media include U disk, mobile hard disk, read-only memory (ROM), random access memory (RAM), magnetic disk or optical disk, and other media capable of storing program codes.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A method for transmitting data, comprising:
sending, by a network device, configuration information to a terminal device, the configuration information comprises:
information for indicating a starting position of transmission of an uplink data block; wherein the information for indicating the starting position of the transmission of the uplink data block is used for indicating a resource position where a first transmission of the uplink data block is capable of being initiated in a non-dynamic resource, and the non-dynamic resource is configured by the network device to the terminal device for non-dynamic scheduling transmission; and
receiving, by the network device, the uplink data block sent by the terminal device according to the configuration information;
wherein the non-dynamic scheduling comprises a semi-statically configured transmission mode and a semi-statically configured plus dynamically triggered transmission mode.

2. The method according to claim 1, wherein the end position of the transmission of the uplink data block is a last transmission opportunity in a period of a non-dynamic resource.

3. A method for transmitting data, comprising:
receiving, by a terminal device, configuration information sent by a network device, the configuration information comprising:
information for indicating a starting position of transmission of an uplink data block; wherein the information for indicating the starting position of the transmission of the uplink data block is used for indicating a resource position where a first transmission of the uplink data block is capable of being initiated in a non-dynamic resource, and the non-dynamic resource is configured by the network device to the terminal device for non-dynamic scheduling transmission; and
sending, by the terminal device, uplink data to the network device according to the configuration information;
wherein the non-dynamic scheduling comprises a semi-statically configured transmission mode and a semi-statically configured plus dynamically triggered transmission mode.

4. The method according to claim 3, wherein the end position of the transmission of the uplink data block is a last transmission opportunity in a period of a non-dynamic resource.

5. A device for transmitting data, comprising a memory, a processor, an input interface, and an output interface, wherein the memory, the processor, the input interface and the output interface are connected through a bus system, the memory is used for storing programs, instructions, or codes, and the processor is used for executing programs, instructions, or codes in the memory to:
control the output interface to send configuration information to a terminal device, the configuration information comprising:
information for indicating a starting position of transmission of an uplink data block; wherein the information for indicating the starting position of the transmission of the uplink data block is used for indicating a resource position where a first transmission of the uplink data block is capable of being initiated in a non-dynamic resource, and the non-dynamic resource is configured by a network device to the terminal device for non-dynamic scheduling transmission; and
control the input interface to receive the uplink data block sent by the terminal device according to the configuration information;
wherein the non-dynamic scheduling comprises a semi-statically configured transmission mode and a semi-statically configured plus dynamically triggered transmission mode.

6. The device according to claim 5, wherein the end position of the transmission of the uplink data block is a last transmission opportunity in a period of a non-dynamic resource.

7. A device for transmitting data, comprising a memory, a processor, an input interface, and an output interface, wherein the memory, the processor, the input interface and the output interface are connected through a bus system, the memory is used for storing programs, instructions, or codes, and the processor is used for executing programs, instructions, or codes in the memory to:
control the input interface to receive configuration information sent by a network device, the configuration information comprising:
information for indicating a starting position of transmission of an uplink data block; wherein the information for indicating the starting position of the transmission of the uplink data block is used for indicating a resource position where a first transmission of the uplink data block is capable of being initiated in a non-dynamic resource, and the non-dynamic resource is configured by the network device for non-dynamic scheduling transmission; and
control the output interface to send uplink data to the network device according to the configuration information;
wherein the non-dynamic scheduling comprises a semi-statically configured transmission mode and a semi-statically configured plus dynamically triggered transmission mode.

8. The device according to claim 7, wherein the end position of the transmission of the uplink data block is a last transmission opportunity in a period of a non-dynamic resource.

9. The method according to claim 1, wherein the configuration information further comprises information for indicating an end position of transmission of the uplink data block.

10. The method according to claim 9, wherein the starting position of the transmission of the uplink data block is flexible, and the end position of transmission of the uplink data block is fixed.

11. The method according to claim 3, wherein the configuration information further comprises information for indicating an end position of transmission of the uplink data block.

12. The method according to claim 11, wherein the starting position of the transmission of the uplink data block is flexible, and the end position of transmission of the uplink data block is fixed.

13. The device according to claim 5, wherein the configuration information further comprises information for indicating an end position of transmission of the uplink data block.

14. The device according to claim 13, wherein the starting position of the transmission of the uplink data block is flexible, and the end position of transmission of the uplink data block is fixed.

15. The device according to claim 7, wherein the configuration information further comprises information for indicating an end position of transmission of the uplink data block.

16. The device according to claim 15, wherein the starting position of the transmission of the uplink data block is flexible, and the end position of transmission of the uplink data block is fixed.

* * * * *